V. KREFL.
AUTOMOBILE BUMPER.
APPLICATION FILED JAN. 11, 1922.
1,416,358.
Patented May 16, 1922.
2 SHEETS—SHEET 2.
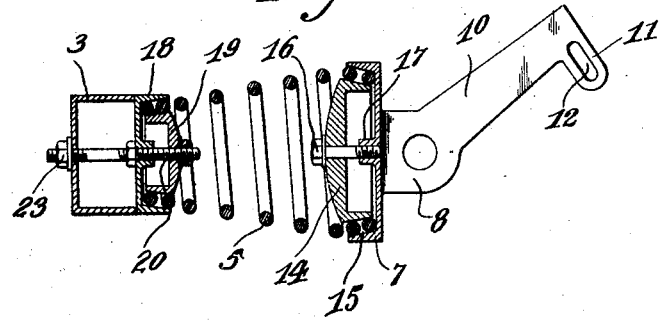
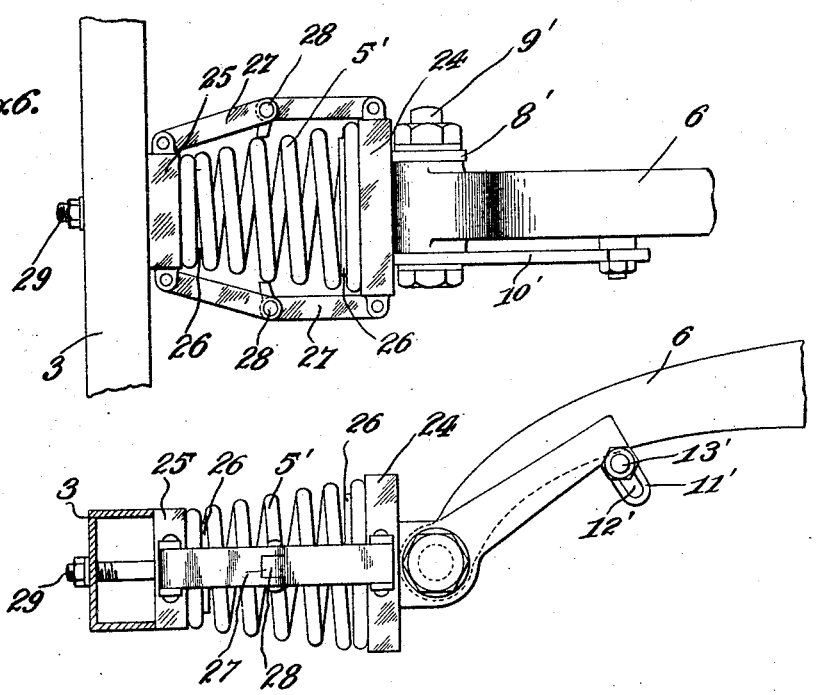
Inventor
Victor Krefl
By Mason, Fenwick & Lawrence
Attorneys

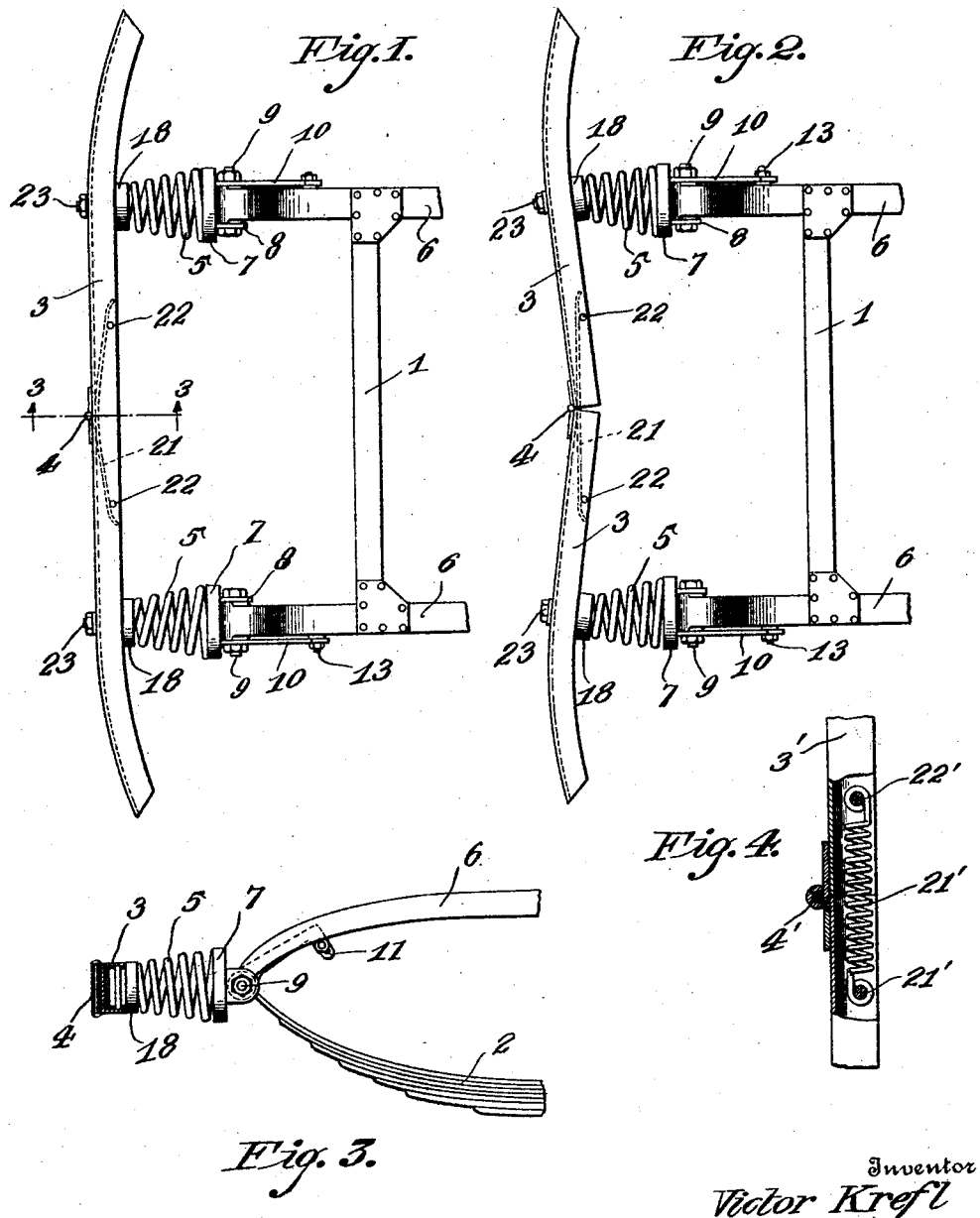

UNITED STATES PATENT OFFICE.

VICTOR KREFL, OF EAGLE RIVER, WISCONSIN.

AUTOMOBILE BUMPER.

1,416,358.  Specification of Letters Patent.  Patented May 16, 1922.

Application filed January 11, 1922. Serial No. 528,449.

*To all whom it may concern:*

Be it known that I, VICTOR KREFL, a citizen of the United States, residing at Eagle River, in the county of Vilas and State of Wisconsin, have invented certain new and useful Improvements in Automobile Bumpers; and I do hereby declare the following to be a full, clear, and exact description of the invention, such as will enable others skilled in the art to which it appertains to make and use the same.

This invention relates to new and useful improvements in bumpers, and more particularly to automobile bumpers, the main object of the present invention being the provision of what is known as a yieldable bumper which can be quickly and readily attached to the forward end of a motor vehicle to form a protection for the vehicle and to absorb any shock or jar which might be conveyed to the body of the vehicle should the same accidentally contact with an object in front of the vehicle.

As a general rule the bumpers in use at the present time are formed of a continuous stiff heavy bar suitably mounted upon the forward end of the vehicle and having yieldable members disposed between the bar and the body of the vehicle to absorb the shock or jar. These stiff heavy bumpers, ofttimes become bent or twisted when striking an object as the blow with which the object is struck has, as a rule, considerable force behind it, due to the momentum of the vehicle. In order to do away with this twisting or bending of the bar, I have provided a bumper formed of a sectional bar, the sections hinged together and normally disposed in an operative position and held in this position by means of a heavy spring member disposed at the rear of the hinge connecting the sections so that when an object strikes the body of the bar, the spring will yield, permitting the body of the bar to move inwardly or break at the hinge. As soon as the object has been removed from the front of the bar, the spring which has been placed under tension through the shock of the blow, will tend to return the bar to its normal position.

A still further object of the present invention is the provision of new and improved means for retaining the yieldable means in position which connects the bumper bar to the body of the vehicle, said means being so constructed and arranged that it can be quickly and readily applied to the vehicle or removed therefrom.

With the above and other objects in view, the invention consists in the novel features of construction, combination and arrangement of parts hereinafter more fully set forth, pointed out in the claims and shown in the accompanying drawings, in which:

Figure 1 is a top plan view illustrating a bumper constructed in accordance with my invention, showing the same applied to the forward end of a motor vehicle;

Fig. 2 is a similar view showing the bumper in a broken position;

Fig. 3 is a sectional view taken on the line 3—3 of Fig. 1;

Fig. 4 is a detail plan view of the central portion of the bumper, parts being broken away and in section to illustrate a modified form of means for yieldably retaining the bumper sections in their operative position;

Fig. 5 is a longitudinal sectional view taken through the member which secures the bumper to the vehicle;

Fig. 6 is a plan view illustrating a slightly modified form of means for attaching the bumper to the vehicle, and Fig. 7 is a side elevation of the form shown in Fig. 6, the bumper bar being shown in cross section.

Referring now more particularly to the drawings, the numeral 1 indicates the frame or chassis of a motor vehicle having the usual spring members 2 attached thereto, and attached to the outer ends of these spring members and portions of the chassis is the bumper 3, said bumper being U-shaped in cross section and formed in two sections, hingedly connected at their inner ends by means of the hinge portion 4.

Interposed between the bumper 3 and the chassis 1 are the coil springs 5, the convolutions of said springs being so arranged as to present a pyramidal form, the outer ends of said springs being connected to each section of the bumper 3 at the intermediate portion thereof. The inner ends of the springs 5 are supported at the outer ends of the springs 2 and the side rails 6 through the medium of a cup-shaped plate 7, said plate having spaced perforated ears 8 formed upon one face thereof and adapted to be disposed upon opposite sides of the ends of the spring 2 and side rails 6 and further mounted upon the transverse bolts 9. The plate 7 is retained against movement with respect to the outer ends of the spring 2 and the side rails 6 by means of an arm 10 formed integral with one of the ears 8 and projecting upwardly at an angle with respect thereto as shown in Fig. 5, and provided at its outer end with a tongue 11 having an elongated slot 12 formed therein to receive securing bolts 13 carried by the side rails to thus permit movement on the part of the rails 6 without interfering with the relative positions of the springs 5 at the ends of the rails 6.

The spring 5 is retained in position by means of a cap member 14, the flanges of which are slightly tapered and are adapted to correspond with the tapered inner walls 15 of the flanges on the plate 7. The inner ends of the coil springs 5 are inserted between the flanges of the cap 14, said coil spring surrounding the cap and the flanges on the plate 7. By moving the cap 14 inwardly onto the plate 7, the opposed tapering flanges will tend to tightly clamp the inner convolutions of the springs 5 between the tapering flanges of the plate 7 and the flanges of the cap 14. This cap 14 is securely retained in position by means of a bolt 16 which extends through the cap and is threaded into a socket 17 formed integral with the central portion of the plate 7 and extending at right angles thereto.

The outer ends of the springs 5 are each retained in position by means of the two opposed cap members 18 and 19 having tapered flanges between which the outer ends of the coil springs are arranged and clamped in position by means of the bolt 20. From this it will be apparent that the spring members 5 serve to support the bumper bar 3 and provided for the yielding movement of the same when an object contacts with the bar. In order to retain the sections of the bar 3 in longitudinal alignment which constitutes the operative position of the same as shown in Fig. 1, a heavy plate spring 21 is placed within the channel portion of the bar, the center of the spring being preferably disposed at the hinge 4 and the ends of the spring engage beneath the transverse pins 22 to retain the spring in position. From this it will be apparent that when the bar 3 contacts with an object, the object striking the bar anywhere between the two spring members 5, the blow will tend to force the inner ends of the sections of the bar inwardly as shown in Fig. 2, placing the spring 21 under tension so that when the object has been removed from contact with the bar 3, the tension of this spring will return the sections of the bar to their normal positions. The sections of the bar 3 are connected to the coil springs 5 by having the bolts 20 extending outwardly through the intermediate portion of the bar and a nut 23 threaded upon the outer end thereof whereby to clamp the sections of the bar tightly onto the cap members 18.

In Fig. 4, I have illustrated a slightly modified form of the invention wherein the spring which retains the sections of the bumper 3 in longitudinal alignment, is of a coil spring type, the ends of which are wrapped around the pins 22' and the coil spring so arranged that the intermediate portion of the spring will align with the hinge member 4', thus when the inner ends of the sections of the bumper are moved inwardly toward the body of the vehicle, the coil spring 21' will be placed under tension and as soon as the weight has been removed from the bumper the tension of the coil spring will return the sections to their normal positions.

In Figs. 6 and 7, I have illustrated a slightly modified form of means for attaching the device to the forward end of a vehicle. This new form of attaching means includes a pair of plates 24 and 25, the plate 24 being provided with the spaced ears 8' perforated to receive the fastening bolt 9' and further provided with an upwardly and rearwardly projecting arm 10' provided with the projection 11' having an elongated slot 12' adapted to be mounted upon the bolt 13'. The inner ends of the coil springs 5' are mounted upon the plate 24 and the outer ends thereof bear against the plates 25. Each of the plates 24 and 25 have an annular shoulder thereon, as shown at 26, whereby to retain the coil springs 5' in position between the two plates. These plates 24 and 25 are suitably connected by means of the pivoted arms 27, the ends of which are hingedly connected to the opposed plates and provided with a hinged joint 28 at the intermediate portion thereof whereby they will readily move outwardly and inwardly in accordance with the movement of the springs 5'. A bolt 29 extends through the plate 25 and through the intermediate portion of the bumper bar in order to secure the bar in position upon the outer end of each spring.

From the above description taken in connection with the accompanying drawings, it will be readily apparent that I have provided an improved bumper wherein the bumper bar is formed in sections, said sections being hingedly connected so that when an object contacts with the bar in the front of the vehicle, the hinge connection of the bar will yield to prevent bending or breaking of the bar and the yieldable means carried thereby will return the bar to its normal position. The device can be quickly and readily applied to any well known make of vehicle and is so constructed that it can be manufactured and placed upon the market at a comparatively small cost.

I claim:

1. A device of the class described including a sectional bar having its sections pivotally connected and yielding means bearing against said pivotal point, means for connecting said bar to a vehicle including elastic compression members disposed between the bar and the vehicle, said means including additional means having connection with parts of the vehicle whereby to permit movement on the part of the vehicle without disturbing the relative positions of the coil springs.

2. A device of the class described including a sectional bar having its sections pivotally connected and yielding means bearing against the pivotal point, means for connecting said bar to a vehicle including bearing means, coil springs having their ends contacting with said bearing members, means cooperating with said bearing members to retain the coil springs in contact with the bearing members, arms on certain of said bearing members having slotted portions at their outer ends, means within said slotted portions for adjustably connecting the arms to a vehicle whereby to permit movement of the vehicle without interfering with the relative positions of the coil springs.

3. A device of the class described including a sectional bar having its sections normally arranged in longitudinal alignment and pivotally connected, yielding means for retaining said sections in their normal position, means connecting said bar with a vehicle including connecting caps, a coil spring having its ends disposed within said caps and clamping members arranged within the convolutions of the coils and movable toward said cap members to clamp the ends of the springs in position.

4. A device of the class described including a sectional bar having its sections pivotally connected and yielding means bearing against said pivotal point, means for connecting said bar to a vehicle including opposed cap members, coil springs having their ends disposed within said cap members and clamping members arranged within the convolutions of the springs and movable toward the cap members to clamp the ends of the springs in place, as and for the purpose set forth.

5. A device of the class described including a sectional bar having its sections pivotally connected and yielding means bearing against said pivotal point, means for connecting said bar to a vehicle including coil springs disposed between the bar and the vehicle, said means including additional means having connection with parts of the vehicle whereby to permit movement on the part of the vehicle without interfering with the relative positions of the coil springs.

In testimony whereof I affix my signature.

VICTOR KREFL.